United States Patent [19]

Yoshimura et al.

[11] Patent Number: 4,573,547

[45] Date of Patent: Mar. 4, 1986

[54] AUTOMATIC RUNNING WORK VEHICLE

[75] Inventors: Shingo Yoshimura; Katsumi Ito; Shigeru Tanaka, all of Osaka, Japan

[73] Assignee: Kubota, Ltd., Japan

[21] Appl. No.: 560,834

[22] Filed: Dec. 13, 1983

[30] Foreign Application Priority Data

Jun. 28, 1983 [JP] Japan ................................ 58-118744
Jun. 28, 1983 [JP] Japan ................................ 58-118745
Jul. 18, 1983 [JP] Japan ................................ 58-130428

[51] Int. Cl.⁴ ........................ B62D 1/26; G06K 11/02
[52] U.S. Cl. ..................................... 180/168; 56/10.2; 180/131; 180/142; 250/202
[58] Field of Search ............... 180/131, 140, 141, 169, 180/168, 79, 142; 250/202; 56/10.2; 244/175

[56] References Cited

U.S. PATENT DOCUMENTS

| 3,079,107 | 2/1963 | Auld | 244/175 |
| 4,184,559 | 1/1980 | Rass | 180/131 |
| 4,211,921 | 7/1980 | Kanetov | 180/169 |
| 4,247,896 | 1/1981 | Schnaibel | 180/168 |
| 4,412,594 | 10/1983 | Furukawa | 180/140 |
| 4,458,775 | 7/1984 | Lestradet | 180/79 |

FOREIGN PATENT DOCUMENTS 556660  2/1957  Italy ................................. 180/140

Primary Examiner—Joseph F. Peters, Jr.
Assistant Examiner—Everett G. Diederiks, Jr.
Attorney, Agent, or Firm—Kane, Dalsimer, Kane, Sullivan and Kurucz

[57] ABSTRACT

An automatic running work vehicle in which both front wheels and rear wheels can be steered and which is provided with a follower sensor for detecting the boundary between an unworked area and a worked area and an orientation sensor for detecting the running direction so as to run automatically along the boundary. Based on the result of detection of the boundary by the follower sensor and on the result of detection of the orientation of the vehicle body by the orientation sensor, the front and rear wheels are steered automatically to correct the running direction automatically.

12 Claims, 19 Drawing Figures

AUTOMATIC RUNNING WORK VEHICLE

BACKGROUND OF THE INVENTION

1. Field of the Invention

The present invention relates to an automatic running work vehicle, and more particularly to such a work vehicle wherein both front wheels and rear wheels can be steered and which is equipped with a follower sensor for detecting the boundary between a worked area and an unworked area so as to run automatically along the boundary.

2. Description of the Prior Art

Such automatic running work vehicles heretofore known are adapted for follower control by the above-mentioned follower sensor to steer the steering wheels based on the result of detection of the boundary and automatically correct the running direction. For example, when both front and rear wheels are steered toward the same direction, the vehicle body can be translated without changing the orientation of the vehicle body, so that during the follower control, the running direction can be corrected while permitting the vehicle body to retain straightforwardness with a reduced likelihood of the vehicle body zigzagging. It is therefore thought useful to adapted both front and rear wheels for steering control.

However, even in the follower control wherein both the front and rear wheels are steered, the orientation of the vehicle body is likely to spontaneously deviate from the direction of the boundary owing to the slippage of the wheels. Thus, there is the drawback that the running direction can not be corrected efficiently to drive the vehicle along the boundary merely by steering the vehicle body for translation.

SUMMARY OF THE INVENTION

An object of the present invention, which has been accomplished in view of the foregoing situation, is to provide an automatic running work vehicle which is provided with means for automatically correcting its running direction efficiently in accordance with the deviation of the vehicle body from the boundary along which the vehicle is to run under follower control.

To fulfill the above object, the automatic running work vehicle of the present invention is characterized in that the vehicle is provided with an orientation sensor for detecting the running direction of the vehicle body and is subjected to steering control based on the result of detection of a boundary by a follower sensor, the vehicle being provided with means for automatically changing the steering control to translation steering for steering both front wheels and rear wheels of the vehicle toward the same direction or alternatively to turn steering for steering the front wheels and the rear wheels toward directions opposite to each other, in accordance with the result of comparison between a reference orientation and the running orientation detected by the orientation sensor.

Because of the above feature, the present vehicle has the following outstanding advantage.

For the correction of the running direction, it is determined whether the vehicle body is deviated from the boundary in a parallel or oblique position relative thereto, based on the direction of deviation detected by the follower sensor with respect to the boundary and also on the angle of deviation detected by the orientation sensor with respect to the reference orientation, i.e., the direction of the boundary. Since the vehicle can be steered according to the deviation thus determined, the vehicle can be rapidly returned to the desired running direction along the boundary and is given greatly improved ability to run straightforward.

Other features and advantages of the present invention will become apparent from the following description.

BRIEF DESCRIPTION OF THE DRAWINGS

The drawings show embodiments of automatic running work vehicle according to the present invention.

FIG. 7 is a diagram showing the state of a boundary;

DESCRIPTION OF THE PREFERRED EMBODIMENTS

Figure 1:
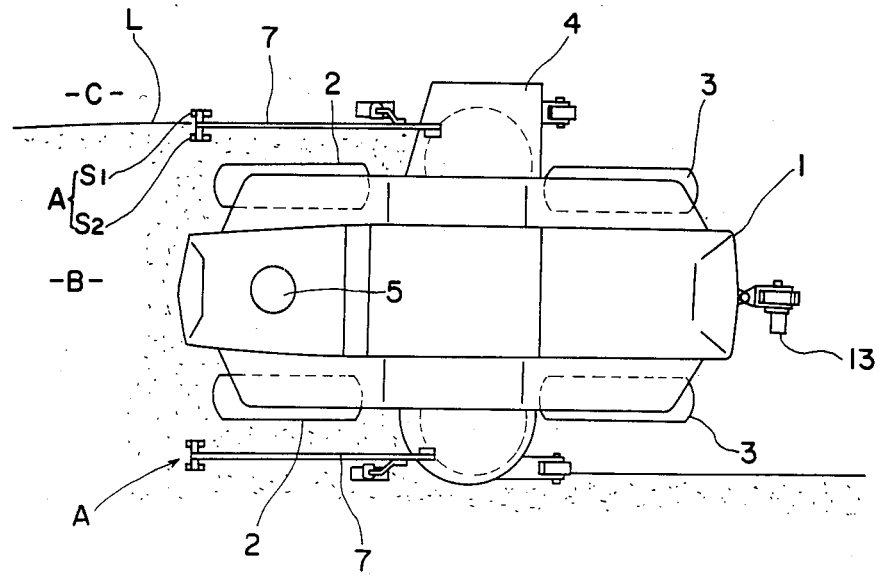
FIG. 1 is an overall plan view of a mowing vehicle.
Figure 2:
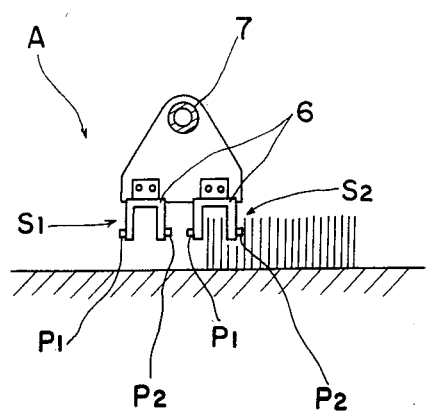
FIG. 2 is a fragmentary front view of a follower sensor.

FIG. 1 shows a mowing vehicle as an automatic running work vehicle. The body 1 of the vehicle has front wheels 2, 2 and rear wheels 3, 3 all of which can be steered. The vehicle body 1 is provided with a mower 4 incorporating cutting disk blades and vertically movably suspended from an intermediate portion thereof. The vehicle body 1 further has follower sensors A, A for detecting the boundary L between an unmowed area B as an unworked area and a mowed area C as a worked area, and a geomagnetic sensor 5 adapted to judge the orientation by detecting the intensity of geomagnetism to serve as an orientation sensor for detecting the running orientation $\Psi$ of the vehicle body 1.

Based on the result of detection of the boundary L by the follower sensor A and on the result of detection of the running orientation $\Psi$ by the geomagnetic sensor 5, both the front and rear wheels 2,2 and 3, 3 are steered to automatically correct the running direction.

The follower sensor A comprises two photosensors S1, S2 arranged side by side laterally of the vehicle body 1. A sensor mount frame 7 attached to the mower 4 is fixedly provided with substantially U-shaped sensor frames 6, 6. Each of the photosensors S1, S2 includes a pair of light-emitting elements P1 and photocells P2 attached to opposite inner sides of the frame 7 for sensing the presence or absence of grass to be brought into the space therebetween with travel of the vehicle body 1 to detect the boundary between the unmowed area and the mowed area. The sensor A is not limited to one comprising the photosensors S1, S2 but can be composed of other sensors of the non-contact or contact type or any other type.

A control system will be described for automatically steering the front wheels 2, 2 and the rear wheels 3, 3 based on the detection signals from the follower sensor A and the geomagnetic sensor 5 of the above constructions.

Figure 3:
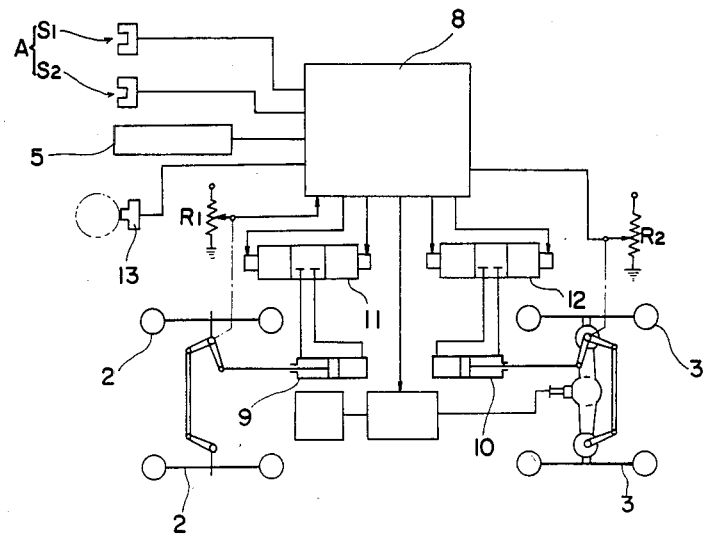
FIG. 3 is a block diagram of a control system.
Figure 4A:
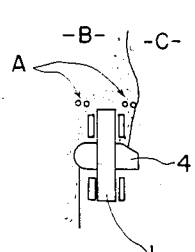
FIGS. 4(a) to (d) are diagrams illustrating modes of deviation from a boundary.
Figure 4B:
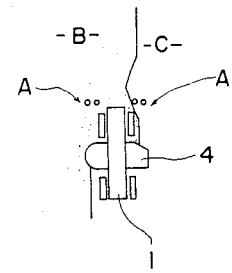
Figure 4C:
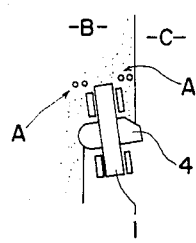
Figure 4D:
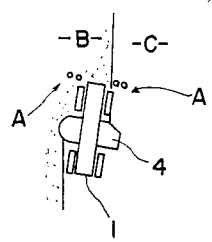

With reference to FIG. 3 showing the control system, the two photosensors S1, S2 constituting the follower sensor A and the geomagnetic sensor 5 feed signals to a control unit 8 which consists essentially of a microcomputer. Based on the detection signals from the sensors S1, S2 and 5, the control unit 8 calculates and delivers control signals for driving electromagnetic valves 11, 12 which operate hydraulic cylinders 9, 10 serving as actuators for steering the front wheels 2, 2 and rear wheels 3, 3, respectively.

While the follower sensor A detects the boundary L, i.e., while the photosensor S1 outward of the vehicle body 1 detects the mowed area C with the other photosensor S2 inward of the vehicle body 1 detecting the unmowed area B, the front wheels 2, 2 and the rear wheels 3, 3 are controlled to neutral position to advance the vehicle body 1 straight.

On the other hand, when the follower sensor A detects that it is away from the boundary L, i.e., when both sensors S1, S2 detect the unmowed area B or the mowed area C, the orientation $\Psi$ detected by the geomagnetic sensor 5 is compared with a reference orientation $\Psi_0$ to judge whether the vehicle body 1 is deviated from the boundary in parallel or obliquely with respect thereto as shown in FIG. 4. The steering angles $\Psi F$, $\Psi R$ for the front wheels 2, 2 and the rear wheels 3, 3, respectivley, in accordance with the mode of the deviation are calculated for correcting the running direction.

More specifically, if the difference between the detected orientation $\Psi$ and the reference orientation $\Psi_0$ is up to a permissible difference $\Delta\Psi_0$, the front and rear wheels 2, 3 are steered at the same predetermined angle S (i.e., $\Psi F = \Psi R = S$) in the same direction, i.e., in a direction opposite to the direction of deviation detected by the follower sensor A with respect to the boundary L to return the vehicle body 1 to the boundary L by translation.

However, if the difference between the detected orientation $\Psi$ and the reference orientation $\Psi_0$ is in excess of the permissible difference $\Delta\Psi_0$, the steering angle $\Psi F$ of the front wheel 2, 2 is set to an angle $S \pm \alpha$ which is the predetermined angle S offset by a predetermined amount $\alpha$. Thus, the front wheels 2, 2 and the rear wheels 3, 3 are steered in opposite directions relative to each other, turning the vehicle body 1 in its entirety while in translation to correct the orientation of the vehible body to the reference orientation $\Psi_0$ and return the body to the boundary L.

FIG. 3 further shows potentiometers R1, R2 for the feedback of the actual steering angles of the front and rear wheels 2, 3, respectively, to the control unit 8, and a distance sensor 13 adapted to produce one pulse per unit distance for detecting the distance of travel of the vehicle body 1. The distance sensor 13 is used for the teaching of the outer periphery to determine the reference orientation $\Psi_0$ and also to detect the range of the unmowed area B for mowing operation.

Figure 5:
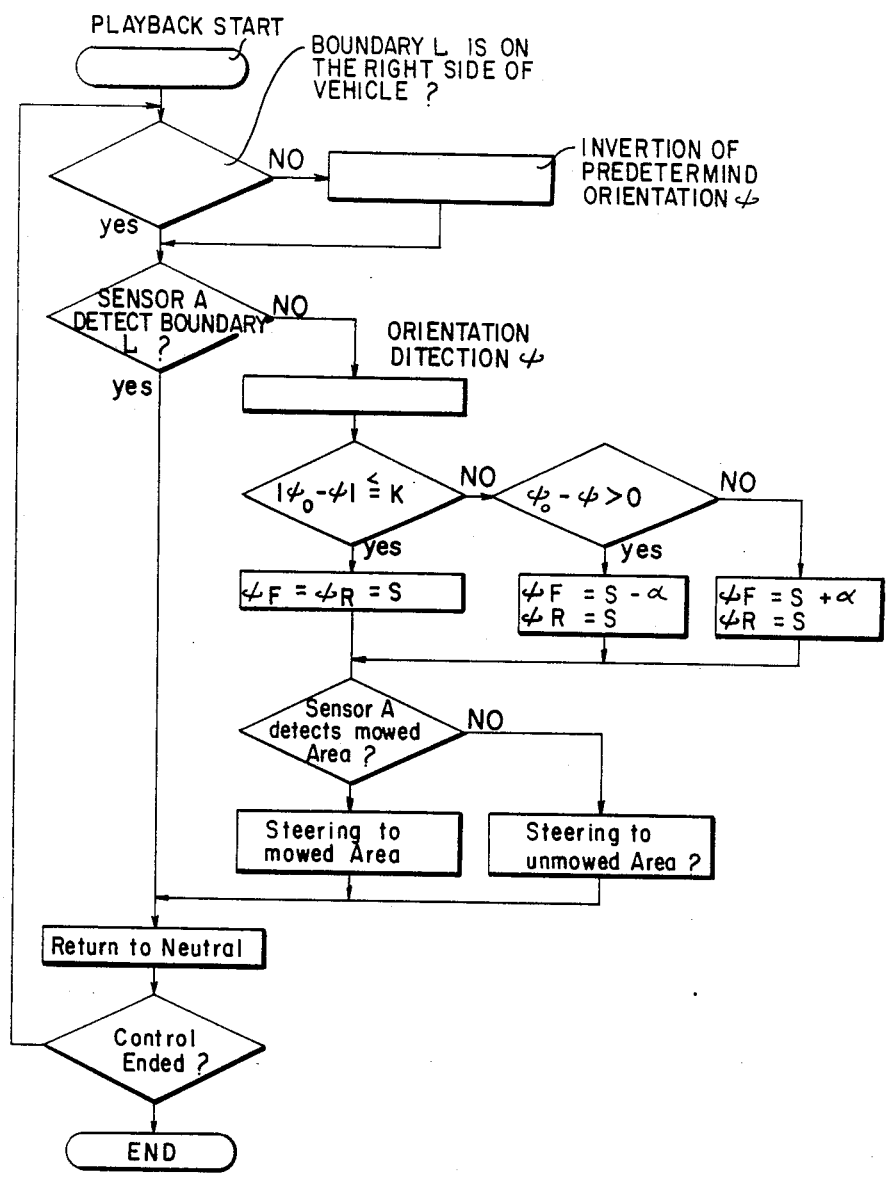
FIGS. 5 and 6 are flow charts showing the operation of a control unit.

FIG. 5 is a flow chart showing the operation of the control unit 8 relating to the foregoing steering control.

Figure 6:
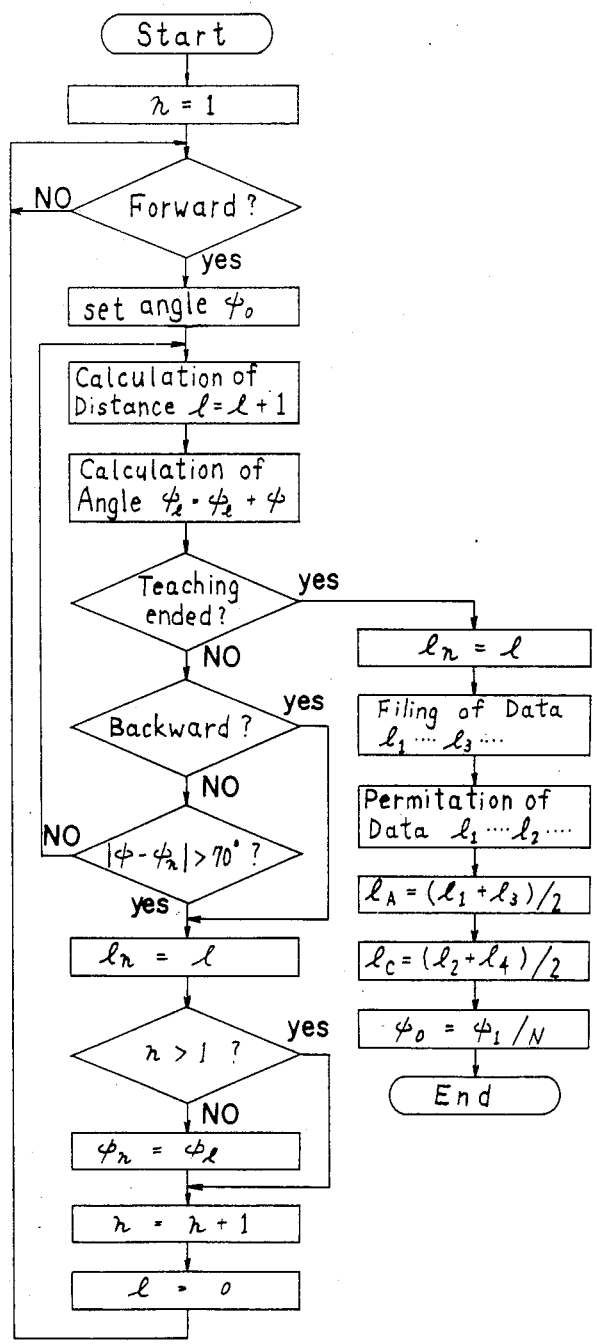

FIG. 6 is a flow chart showing the operation of the unit for the outer periphery teaching for automatically calculating the reference orientation $\Psi_0$ and two sides 1A, 1C of the work range.

Another embodiment will be described below.

In the case of ground working vehicles such as mowing work vehicles of the type described above, the traces of the wheels are different from the traces of the working device owing to the structural difference, and the operation of the sensor for detecting the boundary, as well as of the actuators for steering, involves a delay, so that when the boundary is in a poor condition, correction of the running direction of the vehicle body is likely to produce a new unworked area depending on the direction of the deviation of the running vehicle from the boundary.

To eliminate the above objection, the present embodiment, which is adapted for steering control based on the result of detection of the boundary L by the follower sensor A, is characterized in that it has means for automatically changing the mode of steering control to two-wheel steering for steering the front wheels 2, 2 only or alternatively to turn steering for steering the front wheels 2, 2 and the rear wheels 3, 3 in opposite directions, in accordance with the direction of the deviation of the vehicle body from the boundary L.

Figure 7:
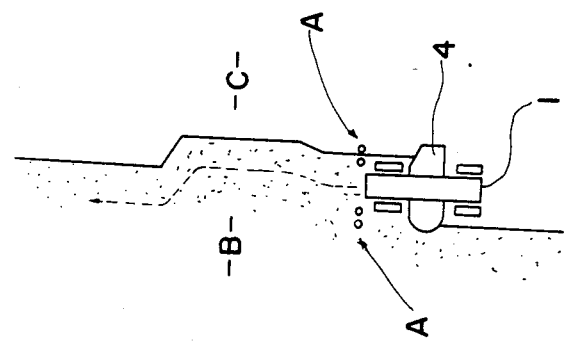
FIGS. 7 et seq. show other embodiments.

When the follower sensor A is detecting the boundary L, i.e., when the photosensor S1 outward of the vehicle body 1 is detecting the mowed area C with the photosensor S2 inward of the vehicle body 1 detecting the unmowed area B as shown in FIG. 7, the front wheels 2, 2 and the rear wheels 3, 3 are controlled to neutral position to advance the vehicle body 1 straight.

On the other hand, when the follower sensor A detects that it is away from the boundary L toward the unmowed area B, i.e., when both the photosensors S1, S2 detect the unmowed area B, the front wheels 2, 2 and the rear wheels 3, 3 are subjected to turn steering control in opposite directions, such that the front wheels 2, 2 are steered toward the mowed area C and the rear wheels 3, 3 toward the unmowed area B to return the orientation of the vehicle body 1 toward the boundary L rapidly. The steering angles $\Psi F$, $\Psi B$ of the front and rear wheels 2, 3 are predetermined angles S, —S, respectively.

Further when the follower sensor A detects that it is away form the boundary L toward the mowed area C, i.e., when both the photosensors S1, S2 detect the mowed area C, the front wheels 2, 2 alone are steered at the predetermined angle S toward the unmowed area B to orient the vehicle body 1 back toward the boundary L gently with a large turning radius so that the mower 4, the working device, will follow the change of the boundary L while travelling.

Thus, according to the direction of deviation of the vehicle body from the boundary, the front wheels only are steered for gentle turning, or the front and rear wheels are steered in opposite directions for rapid turning. By selecting one of these two modes of turning suitably, the rate of change of the running locus of the vehicle body is variable relative to the boundary when the running direction is to be corrected. For exampie, when the running vehicle deviates toward the unworked area owing to an abrupt change of the boundary, the vehicle body is turned with a small turning radius by steering the front and rear wheels in opposite directions to return the orientation of the vehicle body toward the boundary quickly. When the running vehicle deviates toward the worked area, the front wheels only are steered to turn the vehicle body with a large radius as above and return the orientation of the vehicle toward the boundary. Because the control response characteristics are substantially variable in this way, the vehicle body is adapted to follow the boundary with greatly improved effectiveness even if the boundary is in a poor condition involving, for example, an abrupt change. Whereas conventional work vehicles are likely to permit occurrence of an unworked area due to a delayed response to control, the present vehicle is therefore free of this problem and further enables the work device to move along following changes of the boundary.

Figure 8:
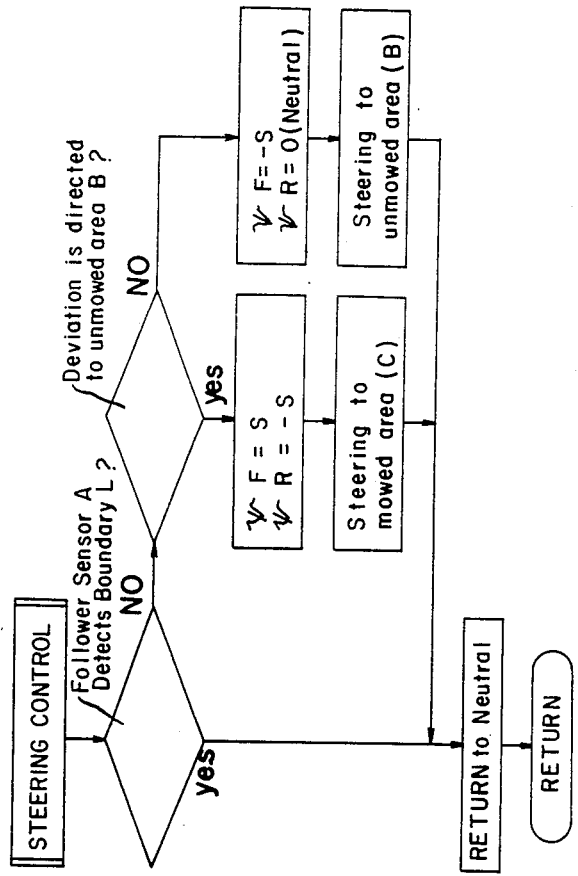
FIG. 8 is a flow chart showing the operation of another embodiment of control unit.

FIG. 8 is a flow chart showing the operation of the control unit 8 of the present embodiment.

Next, another embodiment of mowing vehicle will be described which is adapted for steering control based on the result of comparison between the running orientation $\Psi$ detected by the orientation sensor and the reference orientation $\Psi_0$ and which is provided with means for automatically offsetting the amount S' of steering of the front wheels 2, 2 by a predetermined amount $K\Psi$ to enable the vehicle body to follow the boundary more effectively.

Figure 9A:
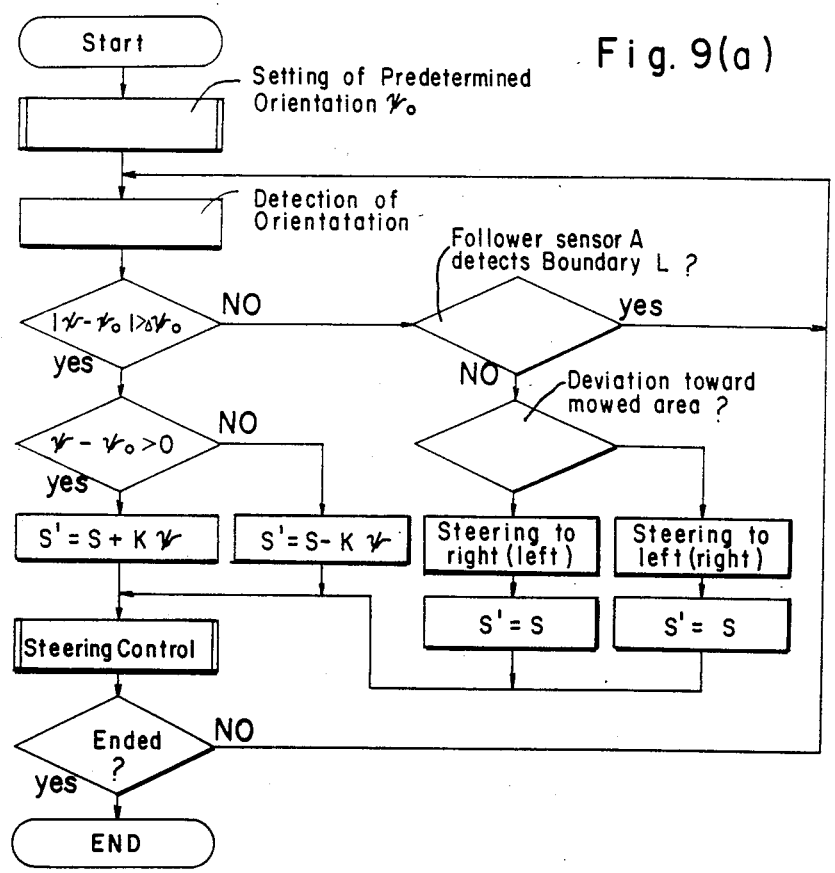
FIGS. 9 (a) and (b) are flow charts showing the operation of another embodiment of control unit.
Figure 9B:
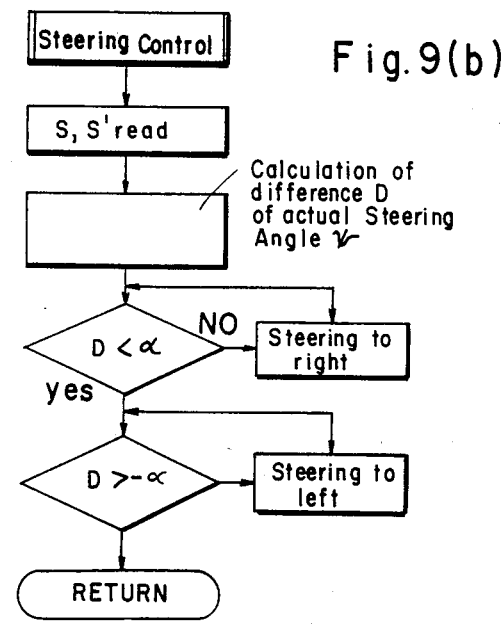

With reference to FIGS. 9 (a) and (b), the vehicle body 1 is usually subjected to steering control (follower control) so as to run along the boundary L between the unmowed area B and the mowed area C, by operating the same hydraulic cylinders 9, 10 as already mentioned according to the result of detecting of the boundary L by the follower sensor A to steer the front and rear wheels 2, 3 in the same direction at the predetermined angle S at the same time and thereby translate the vehicle 1.

On the other hand, when the orientation $\Psi$ of the vehicle 1, i.e., the running direction thereof, detected by the orientation sensor 5 is deviated from a certain reference orientation $\Psi_0$ by more than a predetermined amount $\Delta\Psi_0$, the steering control with use of the follower sensor A is interrupted until the deviation decreases to not larger than the predetermined amount $\Delta\Psi_0$, and the front wheels 2, 2 are steered at the specified angle S offset by the predetermined angle $K\Psi$ which corresponds to the deviation from the reference orientation $\Psi_0$ to correct the orientation of the vehicle body 1.

Thus, the amount of steering of the front wheels is automatically offset by the predetermined amount when the orientation of the vehicle body deviates from the reference orientation, so that when the running direction deviates from the boundary, the front and rear wheels are steered by different amounts, whereby the vehicle body is returned toward the boundary, with its orientation also corrected at the same time. Thus, the vehicle is adapted to run straightforward following the boundary with greatly improved efficiency.

The reference orientation $\Psi_0$ may be set by manually entering the reference orientation $\Psi_0$ in the control unit 8 in advance. Alternatively usable is an orientation which is detected when defining a work range with use of the outer periphery of a work site as the mowed area and conducting outer periphery teaching for simultaneously collecting control paremeters for automatically carrying out the subsequent work as already stated.

Further the means of the present embodiment, which is useful as correcting means for the steering control with the follower sensor, is also usable as correcting means for steering, for example, when the vehicle body is to be driven automatically to avoid an obstacle or is to change the running direction.

Another embodiment of mowing vehicle will be described which is provided with control means for preventing the running vehicle from greatly deviating from the contemplated boundary L even if the boundary is in a poor condition.

Figure 10:
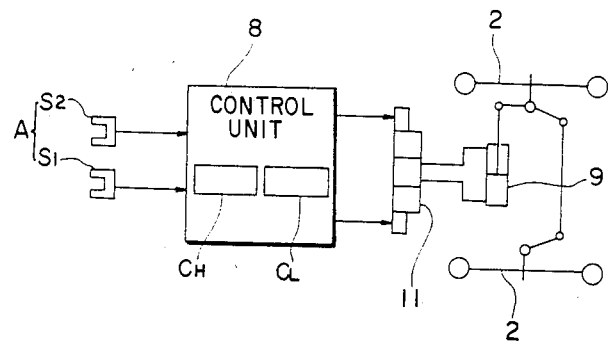
FIG. 10 is a block diagram showing another embodiment for checking changes of output signals from a follower sensor.
Figure 11:
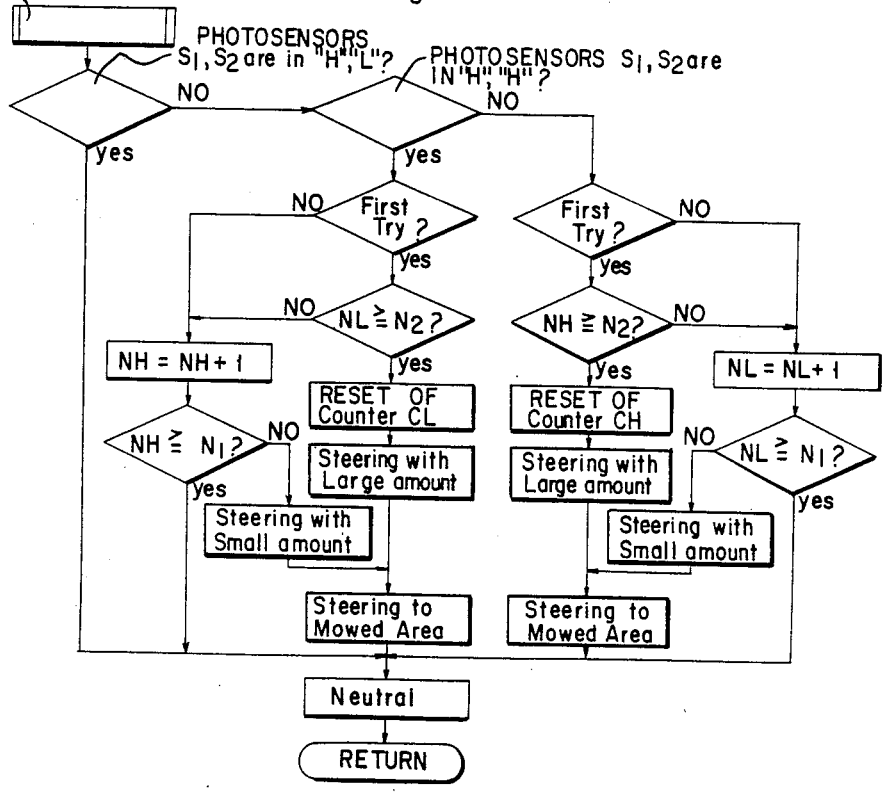
FIG. 11 is a flow chart showing the operation of the control unit of the same.

With reference to FIGS. 10 and 11, when the outputs of both photosensors S1, S2 are "H", "H" or "L", "L", i.e., when the running direction deflects toward the unmowed area B or toward the mowed area C, the number of times steering control is executed until the follower sensor is positioned along the boundary or deviates in the opposite direction is counted by an internal counter CH or CL of the control unit 8 to measure the time taken for the deviation of the running direction toward the direction concerned. When the count value NH or NL of the deviation in the same direction becomes not smaller than a predetermined value N1, i.e., when the combination of outputs of the photosensors S1, S2 remains unchanged upon lapse of a predetermined period of time, the usual mode of steering control is discontinued.

To return the running direction of the vehicle body 1 toward the boundary more efficiently, the present embodiment has the following control means.

When the count value NH or NL for the steering control to effect a correction of the running direction of the vehicle body 1 toWard the unmowed area B or mowed area C in a first try to correct a deviation the count value NL or NH at the opposite side to the direction of deviation of the running direction is not smaller than a predetermined value N2, the amount of first steering is made larger than usual, and the counter CL or CH for the opposite side is reset.

On the other hand, when the count value NH or NL is in excess of the first one, 1 is added to the count, and the usual steering control is executed until the resulting count NH or NL becomes equal to the predetermined value N1 or larger.

According to the present embodiment, one sequence of steering control comprises steering the front wheels 2, 2 by a predetermined amount in a direction opposite to the deviation of the running direction detected by the follower sensor A and returning the wheels to neutral position immediately after the steering. The counters CH, CL count the number of repetitions of this control sequence to measure the duration of steering control.

To give the vehicle improved ability to return toward and follow the boundary, the front wheels may be adapted to return to neutral position immediately when the combination of output signals of the photosensors S1, S2 changes during the steering control.

Briefly, since the vehicle, is not subjected to steering control in the same sidewise direction for more than a specified period of time, the vehicle will not greatly deviate from the position of the boundary even if the boundary is in a poor condition. Accordingly the running direction can be returned toward the contemplated boundary within a shortened period of time, thus precluding occurrence of an unexpected unworked area.

Another embodiment of the follower sensor A will be described below.

Figure 12:
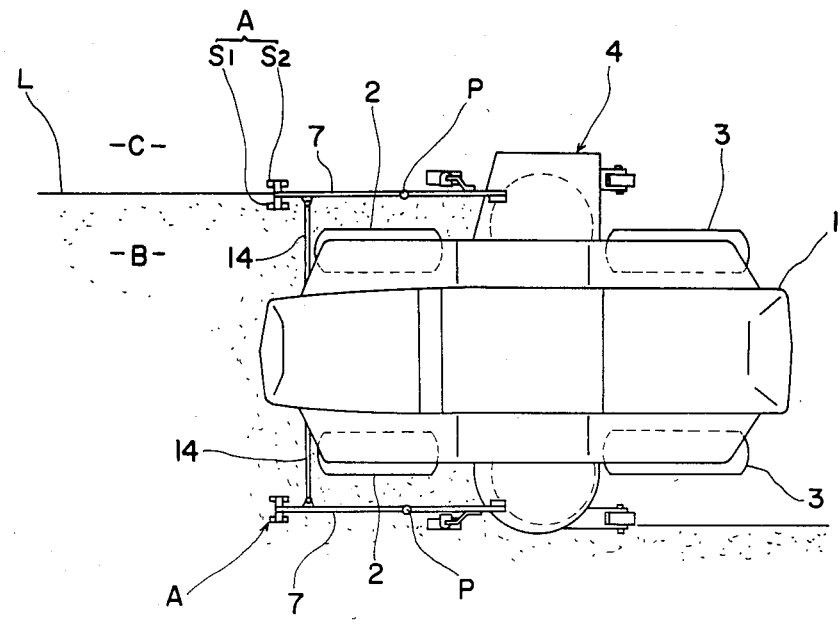
FIGS. 12 and 13 are diagrams showing the arrangement of different embodiment of follower sensor.
Figure 13:
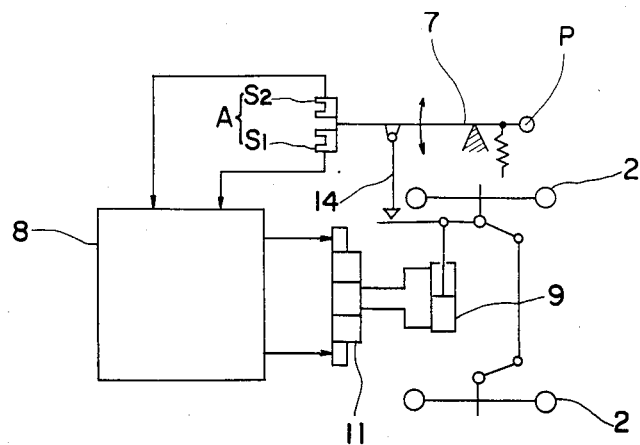

The follower sensor A of this embodiment is made shiftable in operative relation with the steering of the front wheels 2, 2. With reference to FIGS. 12 and 13, the vehicle body is provided with rods 14, 14 which are movable sidewise of the vehicle body with the operation of the hydraulic cylinder for steering the front wheels 2, 2, i.e., with the rightward and leftward movement of the front wheels 2, 2, whereby each sensor mount frame 7 is made pivotally movable about a vertical axis P laterally outward of the vehicle body 1, i.e., toward the mowed area, in operative relation with steering. Thus, the follower sensor A is shiftable with the steering movement of the front wheels 2, 2 sidewise outward of the vehicle body 1.

When the outputs of both photosensors S1, S2 are "H", "H" or "L", "L", i.e., when the running direction is deflected toward the unmowed area B or toward the mowed area C, the front wheels 2, 2 are steered in a direction opposite to the direction of the deflection until the outputs of the photosensors S1, S2 are "H", "L" in combination. Because the follower sensor A, that is, the photosensors S1, S2 are shifted with the steering movement in the direction of from unmowed area B to mowed area C as already stated, the follower sensor A detects the position thereof along the boundary L more early than otherwise, whereupon the steering control is discontinued. This eliminates overshooting due to the delayed response of the steering control system which is attributable to delayed operation of the hydraulic cylinder 9 or electromagnetic valve 11 or to a time lag involved in the processing of signals from the photosensors S1, S2 when the sensors discriminate between the unmowed area B and the mowed area C.

The present arrangement is usable not only for the foregoing embodiments of mowing vehicles but also for various other applications.

For example, it is similarly applicable to a vehicle or the like which is adapted to automatically run along a guide line indicating the course to be run, by optically or electromagnetically detecting the line.

Furthermore, the sensor A for detecting the boundary L may be made shiftable with the steering movement not only outwardly of the vehicle but also laterally outward and inward of the vehicle body 1.

Next, another embodiment will be described which is provided with means for integrating the boundary detection signals from the follower sensor A to remove noise from the signals.

Generally the boundary is identified by detecting whether the running site is an unworked area or a worked area, so that the sensor has the characteristics of giving discrete detection signals, which are not usable directly as a control parameter for steering control. Accordingly it is conventional practice to convert the detection signals of the sensor to a continuous signal output by integration and use the output as the control parameter.

Consequently when the sensor crosses the boundary to produce a change in the detection signal owing to the deflection of the running direction from the boundary, the signal obtained by integrating the sensor output signals involves a delayed change, which in turn delays the response of the steering control system to result in overshooting.

The present embodiment, which is adapted to overcome the above drawback, is characterized in that in setting time constants for integrating a detection signal change of the follower sensor from the state of detecting an unworked area to the state of detecting a worked area, the time constant of the sensor S1 disposed toward the worked area with respect to the direction of advance of the vehicle body is set to a value smaller than the time constant of the sensor S2 disposed toward the unworked area.

Figure 14:
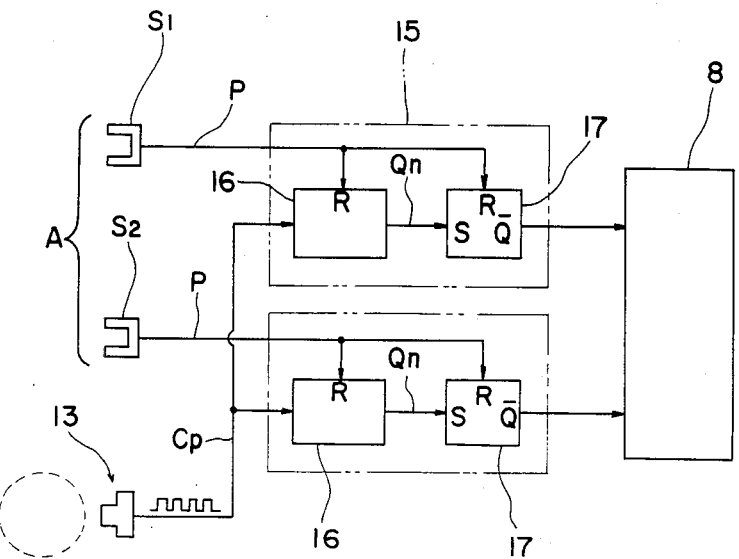
FIG. 14 is a block diagram showing a circuit for processing output signals from the follower sensor.

Stated more specifically with reference to FIG. 14, the signals from the follower sensor A are integrated by signal processing circuits 15 and fed to the control unit 8.

Figure 15:
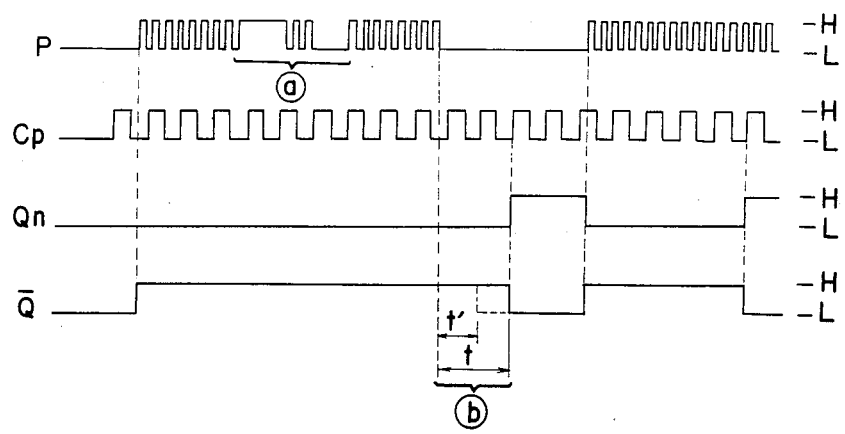
FIG. 15 is a time chart showing the operation of the same.

As shown in FIGS. 14 and 15, the signal processing circuit 15 is provided for each of the photosensors S1, S2 of the follower sensor A individually. The circuit 15 comprises a counter 16 for counting output pulses Cp from the distance sensor 13 and generating a carrier singal Qn of "H" level for every predetermined count value N1 or N2, and a flip-flop 17 settable by the output of carrier signal Qn from the counter 16.

The counter 16 and the flip-flop 17 have their resetting terminals R connected together and are repeatedly resettable by sensor output singals P of "H" level emitted by the photosensor S1 or S2 and indicating the state of detecting the unmowed area B, i.e., grass.

Thus, the counter 16 remains in the reset state when the sensor singal P is "H" level irrespective of its count value, with the carrier signal Qn remaining unchanged at "L" level. Only when the sensor signal P is "L" level and the predetermined count value N1 or N2 is reached, the counter emits a carrier signal of "H" level to set the flip-flop 17.

On the other hand, the flip-flop 17, like the counter 16, remains in the reset state when the sensor signal P is "H" level, continuously producing a signal $\overline{Q}$ of "H" level corresponding to the state of detecting grass, irrespective of the change of sensor signals P. Only when the sensor signal P is "L" level and the carrier signal Qn of "H" is given, the flip-flop 17 delivers an inverted signal $\overline{Q}$ of "L" level corresponding to the state of not detecting grass.

Accordingly when the photosensor S1 or S2 detects grass, the flip-flop 17 is reset simultaneously therewith, subsequently giving the signal $\overline{Q}$ of "H" level irrespective of whether the sensor signal P is "H" or "L". However, when the vehicle body 1 has travelled a predetermined distance with the photosensor S1 or S2 remaining in the state of not detecting grass, the signal $\overline{Q}$ is always inverted to "L" level, thus giving a signal indicating the state of not detecting grass.

Consequently even if the sensor signal P undergoes discontinuous changes of "H" and "L" and includes a portion (a) of larger pulse width than the other portion due to varying densities of grass as shown in FIG. 15, the flip-flop 17 produces a continuous singal $\overline{Q}$ of "H" level, thus assuring the operation of the control unit 8 free of errors.

The count value N1 predetermined for the counter 16 of the signal processing circuit 15 for the photosensor S1 which is disposed outwardly of the vehicle body 1 is smaller than the count value N2 predetermined for the counter 16 of the circuit 15 for the photosensor S2. In other words, the integration time constant for the photosensor S1 is smaller than the integration time constant for the sensor S2. For this reason, the time lag t' between the detection of absence of grass by the photosensor S1 and the inversion of the flip-flop 17 to "L" level is smaller than the corresponding time lag t of the flip-flop 17 for the photosensor S2 as indicated at (b) in FIG. 15.

This results in the following advantage. When the running direction of the vehicle body 1 deflects from the unworked area B toward the worked area C beyond the boundary L, the steering system responds more early to the signal output from the sensor S1 which actually detects the worked area C, consequently reducing the delay to be involved in correcting the running direction of the vehicle body 1.

More specifically stated, when the vehicle body is to be returned toward the boundary after deviating toward the unworked area, the signal of the sensor outward of the vehicle body (toward the worked area) changes from the state of detecting the unworked area to the state of detecting the worked area with a reduced delay. This reduces the delay in the response of the steering control system in corresponding relation to the signal change, thereby decreasing the amount of overshooting, i.e., the amount of movement of the vehicle body toward the worked area, and expediting the return of the vehicle body toward the boundary.

We claim:

1. An automatic running work vehicle having a vehicle body provided with front and rear steerable wheels for treating areas along a boundary between treated and untreated areas on a surface, said work vehicle comprising:
    foller sensor means for detecting said boundary;
    orientation sensor means for detecting a running orientation of said vehicle;
    signal generating means for determining a deviation of said running orientation from a preset reference orientation and for generating a first signal when said deviation is within a permissible angle and a second signal when said deviation is beyond said angle;
    steering control means for causing said front and rear wheels to steer said vehicle body toward said boundary by steering all said wheels in the same direction in response to said first signal, and by steering respective wheels in different directions to each other until said deviation falls within said permissible angle in response to said second signal, and by returning said wheels to neutral positions when said follwer sensor means detects said boundary.

2. An automatic running work vehicle having a vehicle body provided with front and rear steerable wheels for treating areas along a boundary between treated and untreated areas on a surface, said work vehicle comprising:
    steering means for steering said front and rear wheels to steer said vehicle body toward said boundary;
    follower sensor means for detecting said boundary;
    orientation sensor means for detecting a running orientation of said vehicle;
    signal generating means for determining a deviation of said running orientation from a preset reference orientation and for generating a first signal when said deviation is within a permissible angle and a second signal when said deviation is beyond said angle;
    control means operatively interconnecting said steering means with said follower sensor means and said signal generating means, said control means being provided for (a) causing said steering means to provide said front and rear wheels with the same steering angle in response to said first signal, (b) causing said steering means to provide said respective front and rear wheels with different steering angles from each other until said deviation falls within said permissible angle in response to said second signal, and (c) causing said steering means to return said front and rear wheels to a neutral position when said follower sensor means detects said boundary.

3. A work vehicle of claim 2 wherein said control means includes offset means responsive to said second signal for causing said steering means to provide said respective rear and front wheels with a predetermined steering angle and a steering angle offset from said predetermined angle by a predetermined offset angle.

4. A work vehicle of claim 3 wherein said follower sensor means includes two sensors respectively arranged on opposite sides of said vehicle body and selectively activated and said signal generating means includes means for inverting said reference orientation dependent on the activated sensor.

5. A work vehicle of claim 4 wherein said sensor includes outer and inner sensor members spaced transversely of said vehicle body and having respective detection areas, each said sensor members for determining whether said detection area is treated or untreated and for generating treated area detection or untreated detection signals, and said control means being provided for steering said vehicle body toward an untreated area in response to treated area detection signals from said two sensor members, for steering said vehicle body toward a treated area in response to untreated area detection signals from said two sensors members and for causing said vehicle body to go straight in response to different signals from said two sensor members.

6. A work vehicle of claim 5 wherein said orientation sensor means comprises a geomagnetic sensor.

7. A work vehicle of claim 6 wherein said sensor member includes a light-emitting element and a photocell.

8. An automatic running work vehicle having a vehicle body provided with front and rear steerable wheels for treating areas along a boundary between treated and untreated areas on a surface, said work vehicle comprising:
    steering means for steering said front and rear wheels to steer said vehicle body toward said boundary;
    follower sensor means for detecting said boundary;
    orientation sensor means for detecting a running orientation of said vehicle;
    signal generating means for determining a deviation of said running orientation from a preset reference orientation and for generating a first signal when said deviation is within a permissible angle and a second signal when said deviation is beyond said angle;
    control means operatively interconnecting said steering means with said follower sensor means and said signal generating means, said control means being provided for (a) causing said steering means to provide said front and rear wheels with the same steering angle in response to said first signal, for (b) causing said steering means to provide said respective front and rear wheels with opposite steering angles to each other until said deviation falls within said permissible angle in response to said second signal, and for (c) causing said steering means to return said both wheels to a neutral position when said follower sensor means detects said boundary.

9. A work vehicle of claim 8 wherein said follower sensor means includes two sensors respectively arranged on opposite sides of said vehicle body, and said signal generating means includes means for inverting said reference orientation based on which of said sensors is in operation.

10. A work vehicle of claim 9 wherein said sensor includes outer and inner sensor members spaced transversely of said vehicle body and having respective detection areas, each said sensor members for determining whether said detection area is treated or untreated and for generating treated area detection or untreated area detection signals, and said control means being provided for (i) steering said vehicle body toward an untreated area in response to treated area detection signals from said two sensor members, for (ii) steering said vehicle body toward a treated area in response to untreated area detection signals from said two sensor members and for (iii) causing said vehicle body to go straight in response to different signals from said two sensor members.

11. A work vehicle of claim 10 wherein said orientation sensor means comprises a geomagnetic sensor.

12. A work vehicle of claim 11 wherein said sensor member includes a light-emitting element and photocell.

* * * * *

UNITED STATES PATENT AND TRADEMARK OFFICE
CERTIFICATE OF CORRECTION

PATENT NO. : 4,573,547

DATED : March 4, 1986

INVENTOR(S) : Shingo Yoshimura; Katsumi Ito; Shigeru Tanaka

It is certified that error appears in the above-identified patent and that said Letters Patent is hereby corrected as shown below:

Column 6, line 30, "to Ward" should be --toward--; and

Column 9, line 23, "foller" should be --follower--.

Signed and Sealed this

Twenty-ninth Day of July 1986

[SEAL]

Attest:

DONALD J. QUIGG

Attesting Officer

Commissioner of Patents and Trademarks